United States Patent [19]

Endicott et al.

[11] Patent Number: 6,047,295
[45] Date of Patent: Apr. 4, 2000

[54] COMPUTER SYSTEM, PROGRAM PRODUCT AND METHOD OF MANAGING WEAK REFERENCES WITH A CONCURRENT MARK SWEEP COLLECTOR

[75] Inventors: John Clarence Endicott, Rochester; Daniel Rodman Hicks, Byron, both of Minn.; Elliot Karl Kolodner, Haifa, Israel; Robert Carl Seemann, Rochester, Minn.

[73] Assignee: International Business Machines Corporation, Armonk, N.Y.

[21] Appl. No.: 09/072,847

[22] Filed: May 5, 1998

[51] Int. Cl.$^7$ .................................................. G06F 17/30
[52] U.S. Cl. ............................ 707/206; 707/8; 707/205; 707/103
[58] Field of Search .................................. 707/103, 205, 707/206, 8

[56] References Cited

U.S. PATENT DOCUMENTS

| | | | |
|---|---|---|---|
| 5,274,804 | 12/1993 | Jackson et al. | 707/206 |
| 5,321,834 | 6/1994 | Weiser et al. | 395/600 |
| 5,485,613 | 1/1996 | Engelstad et al. | 707/206 |
| 5,765,174 | 6/1998 | Bishop | 707/206 |

OTHER PUBLICATIONS

Doligez, Damien, et al., "Portable Unobstrusive Garbage Collection For Multi-Processor Systems", Conference Record of the Twenty-first Annual ACM Symposium on Principles of Programming Languages, (Jan. 17–21, 1994), Portland, Oregon, pp. 70–83.

Dijkstra, Edsger et al., "On–the–Fly Garbage Collection: An Exercise in Cooperation", *Communications of the ACM*, (Nov., 1978), pp. 966–975.

Moon, David A., "Garbage Collection in a Large LISP System", Conference Record of the 1984 ACM Symposium on LISP and Functional Programming, (Aug. 6–8, 1984), Austin, Texas, pp. 235–246.

Boehm, Hans J. et al., "Mostly Parallel Garbage Collection", Proceedings of the ACM SIGPLAN 91 Conference on Programming Language Design and Implementation, (Jun., 1991), Toronto, Ontario, Canada, pp. 157–164.

Gosling, James, et al., *The Java™ Language Specification*, Reading, MA: Addison–Wesley, pp. 1–825.

"Class java.lang.ref.Reference", http://java.sun.com/products/jdk/1.2api/java.lang.Ref.html.

*Primary Examiner*—Jean R. Homere
*Attorney, Agent, or Firm*—Wood, Herron & Evans, L.L.P.

[57] ABSTRACT

A computer system, program product, and method of managing weak references with a concurrent mark sweep collector inhibit access, while processing weak references, to only those weak references whose referenced objects have not yet been determined to be strongly-reachable (i.e., reachable other than through a weak reference) during a current collection cycle. As such, access to specific weak references during processing thereof by a concurrent mark sweep collector is selectively inhibited to ensure synchronization for all weak references without necessarily stopping the execution of all program threads that attempt to access such weak references while executing in a computer system, thereby minimizing the processing overhead of managing weak references and improving system performance.

32 Claims, 5 Drawing Sheets

COMPUTER SYSTEM, PROGRAM PRODUCT AND METHOD OF MANAGING WEAK REFERENCES WITH A CONCURRENT MARK SWEEP COLLECTOR

CROSS REFERENCE TO RELATED APPLICATIONS

This application is related to U.S. patent application Ser. No. 09/072,849, filed on even date herewith by John Clarence Endicott et al. and entitled "COMPUTER SYSTEM, PROGRAM PRODUCT AND METHOD OF COLLECTING INTERNED DATA WITH A MARK SWEEP COLLECTOR", which application is incorporated by reference herein.

FIELD OF THE INVENTION

The invention is generally related to computers and computer software. More specifically, the invention is generally related to the management of weak references using a concurrent mark sweep collector.

BACKGROUND OF THE INVENTION

Managing available memory is critically important to the performance and reliability of a computer system. Specifically, data used by a computer program is typically stored in a computer system within a memory that has a limited address space. In many computer systems, data is stored in the form of "objects" that are allocated space in a portion of the memory referred to as an "object heap". Objects also often include "references" (also known as pointers) to other objects so that a computer program can access information in one object by following a reference from another object. Typically each computer program has its own object heap, so if multiple computer programs are active in a computer system, multiple object heaps may be maintained in the system.

Whenever new data is to be used by a computer program, a portion of the free memory is reserved for that data using a process known as "allocating" memory. Given that the amount of memory available in a computer system is limited, it is important to free up, or "deallocate", the memory reserved for data that is no longer being used by the computer system. Otherwise, as available memory is used up, the performance of the computer system typically decreases, or a system failure may occur.

A computer program known as a garbage collector is often used to free up unused memory that has been allocated by other computer programs in a computer system. Often, a garbage collector executes concurrently with other computer programs to periodically scan through the object heap(s) and deallocate any memory that is allocated to unused objects (a process also known as "collecting" objects). Different computer programs that operate concurrently in a computer system often include one or more "threads" that execute concurrently with one another. Moreover, when different computer programs use different object heaps, separate garbage collector computer programs, also referred to as collector threads, may be used to manage each object heap.

One specific type of garbage collector is a concurrent mark sweep collector, which sequences repeatedly through individual collection cycles, with each cycle sequentially operating in mark and sweep stages. In the mark stage, the collector scans through an object heap beginning at its "roots", and attempts to "mark" objects that are still are reachable from a root (i.e., that are referenced directly by a root or by a chain of objects reachable from a root). In the sweep stage, the collector scans through the objects and deallocates any memory reserved for objects that are unmarked as of completion of the mark stage.

Concurrent mark sweep collectors are often very desirable for collecting unused data as they often have minimal impact on the responsiveness of program threads. However, by allowing program threads to run concurrently with a collector, a problem arises due to the fact that the program threads could interfere with the work of the collector. This interference could confuse the collector and cause the collector to collect an object that is actually reachable. If a such an object is collected, unexpected behavior may occur, possibly resulting in incorrect behavior and/or in partial or total system failure.

The process of ensuring that data accessed by one computer program in a computer system is not unpredictably affected by the operation of another computer program is generally referred to as "synchronization". Synchronization is typically not a concern for "stop-the-world" garbage collectors, as these types of collectors halt execution of all active program threads during collection, which prevents other program threads from unpredictably modifying data during collection. However, halting all program threads, even for a short time, significantly degrades system performance and degrades the responsiveness of program threads. Thus, "stop-the-world" collectors are typically not as desirable as concurrent collectors, and may not be suitable for many applications.

One specific type of object that raises potential synchronization concerns is a "weakly-reachable" object, which is an object that is reachable solely through a "weak" reference. A weak reference is a special type of reference supported by a number of programming environments, and is typically defined as a reference to an object that does not prevent the object from being collected. Objects that are reachable from a root, on the other hand, are sometimes referred to as being "strongly-reachable" to distinguish such objects from weakly-reachable objects.

Among other uses, a number of environments, e.g., the Java programming language from Sun Microsystems, support the use of weak references. An important use of Java weak references is to reference caches of data objects that are shared by a number of program threads. When used in this way, the weak references are associated with identifiers to permit a program thread to locate a shared data object by searching for a particular weak reference matching an identifier passed by the program thread.

As one example, in a customer ordering system, different program threads (e.g., ordering threads, warehousing threads, payment threads, etc.) may attempt to access a cache of customer objects using a unique identifier (e.g., a customer's phone number or social security number). References to the customer objects are defined as reference objects that include pointers to the customer objects referenced thereby. The reference objects are then arranged in a hash table that is searchable by identifier to locate the particular reference object corresponding to a particular identifier. Then, through a process known as "dereferencing", a pointer to the particular customer object itself may be returned to a program thread attempting to locate such an object so that the data stored within the customer object may be accessed directly using the pointer. Through this arrangement, the shared customer objects may be located and accessed in a fast and efficient manner.

Since conventional garbage collectors do not ordinarily collect reachable objects, a generic reference (also known as a "strong" reference) from a reference object to a shared data object would typically prevent the shared data object from being collected—even if the shared data object was only reachable through the reference object. However, by making such a reference a weak reference, a garbage collector may be permitted to collect a shared data object that is reachable solely through the reference object, consequently permitting a greater number of unused data objects to be collected by a garbage collector.

One concern that arises with the use of weak references, however, is that a program thread often must take special precautions when accessing an object through a weak reference. Otherwise, a program thread could attempt to access a weak reference to obtain the pointer to the object referenced thereby, and then have the weak reference later cleared by the collector, and the object referenced thereby collected. The pointer obtained by that program thread would then point to a non-existent object, and any attempt to use that pointer could result in unpredictable behavior by the computer system, or even partial or total system failure. As a result, access to weak references must be carefully synchronized with collection to ensure correctness in a computer system.

In addition, in many environments, it is desirable to clear weak references automatically by the collector after strong-reachability is lost to referenced objects. To clear these references, it is important that all weak references from which an object is weakly-reachable be cleared in a step that is simultaneous from the point of view of any program threads executing in a computer system. Otherwise, this could lead to multiple copies of the weakly-referenced object, and possibly unpredictable behavior in the computer system.

Synchronizing access to weak references in a conventional concurrent mark sweep collector could effectively turn the collector into a stop-the-world collector, however, as all program threads that try to follow weak references would need to be stopped while the collector processes the weak references. Halting such program threads, even for a short time, could significantly degrade system performance.

Therefore, a significant need exists for an improved manner of efficiently collecting weakly-reachable objects with a minimal impact on system performance.

SUMMARY OF THE INVENTION

The invention addresses these and other problems associated with the prior art by providing a computer system, program product, and method of managing weak references with a concurrent mark sweep collector that, while processing weak references, inhibit access to only those weak references whose referenced objects have not yet been determined to be strongly-reachable (i.e., reachable other than through a weak reference) during a current collection cycle. Selective access inhibition in this manner is possible due to the realization that, once an object referenced by a particular weak reference is determined to be strongly-reachable during a current collection cycle, the object is ensured of not being collected during the current collection cycle. Moreover, the weak reference is also ensured of not being cleared when it is processed by the collector given its reference to a known strongly-reachable object. Additional synchronization for this weak reference is thus unnecessary for the remainder of the current collection cycle after the determination is made, so other program threads may be permitted to freely access this weak reference without waiting for the collector to complete the processing of all existing weak references.

Put another way, the invention provides a manner of selectively inhibiting access to specific weak references during processing thereof by a concurrent mark sweep collector to ensure synchronization for weak references without necessarily stopping the execution of all program threads that attempt to access such weak references while executing in a computer system. Program threads that attempt to access weak references that meet the criteria of referencing known strongly-reachable objects are not stopped, and as a result, the processing overhead of managing weak references is minimized, and system performance is improved.

The determination of whether a weak reference references a strongly-reachable object may be made in a number of manners consistent with the invention. For example, the reachability of a referenced object may be determined during a trace operation performed by a concurrent mark sweep collector. In addition, a referenced object may be indicated to be strongly-reachable in response to predetermined activities that occur with respect to a weak reference thereto during a current collection cycle, e.g., when performing a dereference operation with the weak reference, when creating a weak reference, and/or when updating a weak reference, among others.

Therefore, consistent with one aspect of the invention, a method, computer system and program product are provided that manage weak references with a concurrent mark sweep collector. During a current collection cycle of the concurrent mark sweep collector, a plurality of objects are analyzed to determine whether any of the objects are strongly-reachable. In addition, weak references to the plurality of objects are processed and at least one weak reference to an object that is not determined to be strongly-reachable is cleared. Furthermore, while processing the weak references, access to a predetermined weak reference is inhibited only if the object referenced by the predetermined weak reference has not yet been determined to be strongly-reachable during the current collection cycle.

Consistent with another aspect of the invention, a method, computer system and program product are provided that manage weak references with a concurrent mark sweep collector. A plurality of collection cycles are performed, with a collection cycle indicator associated with each of the plurality of collection cycles. A weak reference cycle indicator is associated with each of a plurality of weak references, with each weak reference cycle indicator representative of the collection cycle indicator for the then current collection cycle when the object referenced by the weak reference was last determined to be strongly-reachable. In addition, during a current collection cycle, the plurality of weak references are processed by clearing at least one of the plurality of weak references that references an object not determined to be strongly-reachable during the current collection cycle, and inhibiting access to the plurality of weak references during processing of the plurality of weak references. Moreover, during a dereference operation performed on a predetermined weak reference from the plurality of weak references during the current collection cycle, any inhibition of access to the predetermined weak reference established during processing of the plurality of weak references is bypassed if the weak reference cycle indicator associated therewith matches the collection cycle indicator for the current collection cycle.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware Environment

Figure 1:
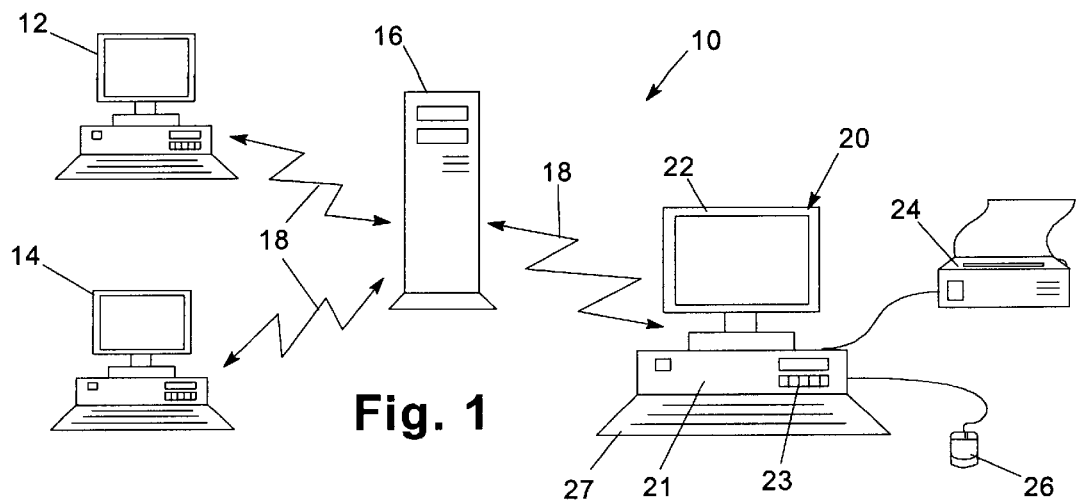
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
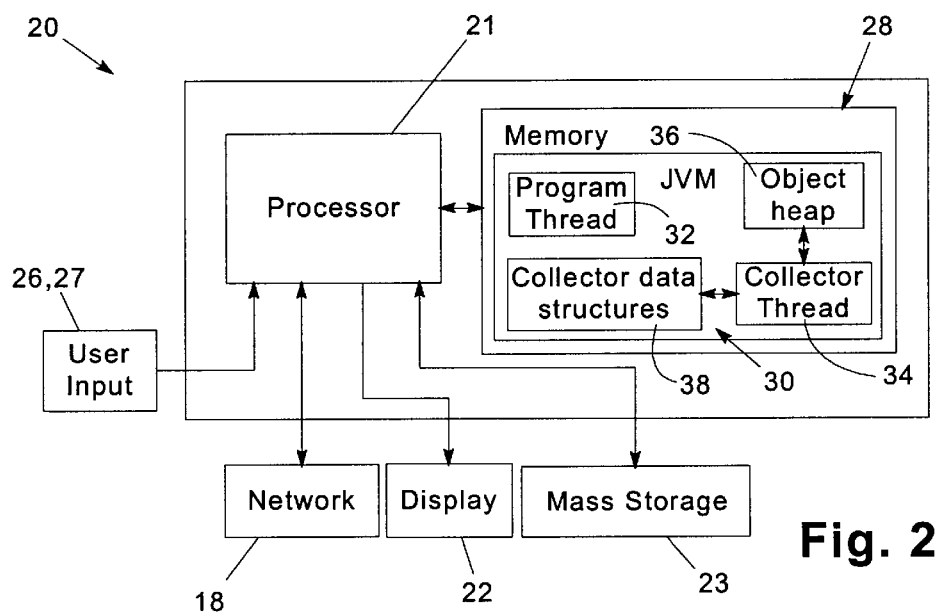
FIG. 2 is a block diagram of an exemplary software environment for the computer system of FIG. 1, illustrating a collector thread consistent with the invention.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A Java Virtual Machine (JVM) execution module 30 is illustrated as resident in memory 28, and is configured to execute program code on processor 21, e.g., one or more program threads 32, as well as a collector thread 34 that is used to deallocate (or "free up") unused data stored in an object heap 36. Collector thread 34, which is described in greater detail below, also utilizes a plurality of data structures 38 (also described in greater detail below) during its operation. Execution module 30 may be resident as a component of the operating system of computer system 20, or in the alternative, may be implemented as a separate application that executes on top of an operating system. Furthermore, any of execution module 30, program thread 32, collector thread 34, object heap 36 and collector data structures 38 may, at different times, be resident in whole or in part in any of memory 28, mass storage 23, network 18, or within registers and/or caches in processor 21.

It should be appreciated that the various software components may also be resident on, and may execute on, other computers coupled to computer system 10. Specifically, one particularly useful implementation of an execution module consistent with the invention is executed in a server such as an AS/400 midrange computer system from International Business Machines Corporation.

It should be appreciated that other software environments may be utilized in the alternative.

Managing Weak References With a Concurrent Mark Sweep Collector

In the illustrated embodiment, weak references are managed using a concurrent mark sweep collector that operates in a collector thread concurrently with other program threads executing in the computer system. Performance of the computer system is improved by selectively inhibiting access by other program threads to only those weak references that reference objects not yet known to be strongly-reachable during the current collection cycle. Access to weak references that reference known strongly-reachable objects is permitted, however, since it is ensured that those strongly-reachable objects will not be later collected by the collector in the current collection cycle, and thus that the weak references will not be cleared by the collector during processing of the weak references. Consequently, there is no risk that a pointer retrieved from a weak reference during an access thereto will become invalid as a result of the collection process.

The use of weak references and/or the use of a concurrent mark sweep collector may be supported in any number of environments, e.g., the Java programming language from Sun Microsystems. However, it should be appreciated that the principles of the invention may also apply to other environments that support weak references and/or dynamic garbage collection.

Figure 3:
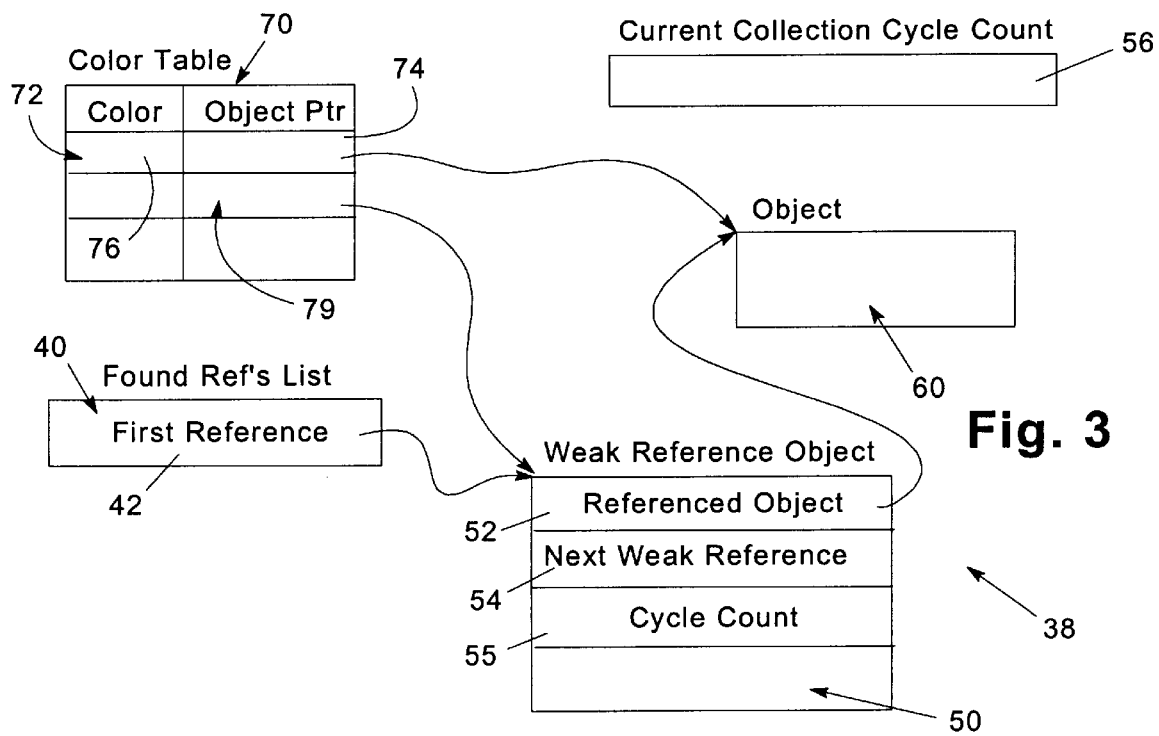
FIG. 3 is a block diagram of various collector data structures for use by the collector thread of FIG. 2.

FIG. 3 illustrates several collector data structures at 38 that are utilized by collector thread 34 (FIG. 2) in collecting weak references. One such data structure is a found references list 40, which includes a list of weak references found during the mark stage of a collection cycle. Weak references may be implemented in a number of manners, e.g., by encapsulating such references as separate objects 50 as shown in FIG. 3, among others.

List 40 may be implemented using any number of data structures. For example, when weak references are implemented as separate objects, the list may be implemented as a linked list, with the start of the list defined by a pointer 42 that points to a first weak reference object 50 in the list. Each weak reference object in turn then includes a referenced object field 52 that stores the pointer to an object 60 referenced thereby, as well as a next weak reference field 54 that stores a pointer to the next weak reference in list 40 (with the last such object including a NULL value in field 54).

Each weak reference also has associated therewith a referenced object reachable indicator that indicates, for a current collection cycle, whether the object referenced by the weak reference has been determined to be strongly-reachable for the current collection cycle. Such an indicator may be associated with a weak reference, for example, as a dedicated field in an object encapsulating the weak reference if weak references are implemented in this manner, or in other manners appropriate for the manner in which weak references are implemented.

A number of manners of implementing a referenced object reachable indicator may be used, e.g., a dedicated flag that is reset at the beginning of each collection cycle, or, as illustrated herein, by associating a collection cycle indicator with each weak reference that indicates when the object referenced by the weak reference was last determined to be strongly-reachable, among others. With this latter implementation, whether or not an object referenced by a weak reference is known to be strongly-reachable for the current collection cycle may be determined by comparing the collection cycle indicator for the weak reference (also referred to herein as a weak reference cycle indicator) with the collection cycle indicator for the current collection cycle.

Any number of collection cycle indicators may be used to distinguish different collection cycles. As illustrated further herein, for example, a collection cycle indicator may be implemented as a cycle count that is maintained in a counter and incremented at the start of each collection cycle. The cycle count may have any range of values. For example, one suitable count is a single bit, which is capable of distinguishing between current and previous collection cycles. Other alternative cycle indicators may be used in the alternative, e.g., multi-bit counts, time stamps, and alphanumeric identifiers, among others.

Therefore, one suitable implementation of the referenced object reachable indicator uses a weak reference cycle count maintained in a field 55 of each weak reference object 50 to store the cycle count of the last collection cycle in which the referenced object for the weak reference was determined to be strongly-reachable. Also, a separate current collection cycle count is maintained in a counter 56 that is incremented at the start of each collection cycle.

Collector thread 34 also relies on a color table 70 that is used to maintain a record of which objects in an object heap 36 are unused and thus suitable for collection thereby. Color table 70 includes a plurality of entries (e.g., entries 72, 79), each of which includes an object pointer field 74 and a color field 76. The color table includes an entry for each object in the object heap, with field 74 providing an explicit or implicit reference to one such object (e.g., object 60 for entry 72 and object 50 for entry 79). Color field 76 indicates the marked/unmarked status of the object pointed to by the corresponding object pointer field 74. Any other data structure or combination of data structures that is capable of providing a one-to-one mapping between an object and a color may be used in the alternative.

Mark sweep collectors are generally well known in the art. Typically, a conventional mark sweep collector employs multiple stages that are cycled through repeatedly to collect unused data in an object heap. A first stage starts a collection cycle. Next, a "mark" stage is performed to scan through the object heap and mark any used, or reachable, objects.

Typically, the mark stage of a conventional mark sweep collector is divided into several distinct stages, e.g., a "mark roots" stage and a "trace" stage. The mark roots stage marks the global and local roots of the object heap—that is, any variables that are defined as global or static or that are stored in various stacks and registers within the computer system. The trace stage then marks the objects reachable from other marked objects. The trace stage is complete when all objects that reference marked objects are also marked.

After the mark stage of a conventional mark sweep collector is performed, a "sweep" stage is performed to sweep the object heap and reclaim any unmarked objects. Moreover, during this stage, the marked status of any marked objects is reset to unmarked for the next collection cycle.

When marking objects in a concurrent collection cycle, a four-color marking scheme is typically utilized by a conventional mark sweep collector. A "white" color indicates that an object is unmarked. A "gray" color indicates that an object is marked, but that its direct descendants may not yet be marked (i.e., some may be white). A "black" color indicates that an object is marked and all of its direct descendants are marked (either gray or black). Finally, a "blue" color indicates that the object is on the free list. With this scheme, "gray" or "black" objects are also referred to as "shaded" objects.

Depending upon the language being supported, additional stages may be present in a collector thread. For example, Java may require a "finalize trace" stage between the mark and sweep stages to identify and trace objects ready for finalization. Moreover, it should be appreciated that various algorithms known in the art may be utilized for the various stages in a collector thread. For example, some collector threads repeatedly scan the object heap until there are no gray objects. See e.g., Dijkstra et al., "On-the-fly Garbage Collection: An Exercise in Cooperation,"=0 *Communications of the ACM*, November, 1978. Other collectors may utilize a Doligez-Gonthier algorithm that repeats a scan only if a newly grayed object is an object that has already been scanned by the current scan. See e.g., Doligez and Gonthier, "Portable Unobtrusive Garbage Collection for Multi-Processor Systems," *Conference Record of the Twenty-first Annual ACM Symposium on Principles of Programming Languages*, January, 1994. Other collectors may avoid a scan by using a marked stack to hold gray objects. Other algorithms may be used in the alternative.

It should be appreciated that each of data structures 38 may include additional data as necessary for other functionality. Moreover, it should be appreciated that other data structures may be utilized to store the same data in the alternative.

Figure 4:
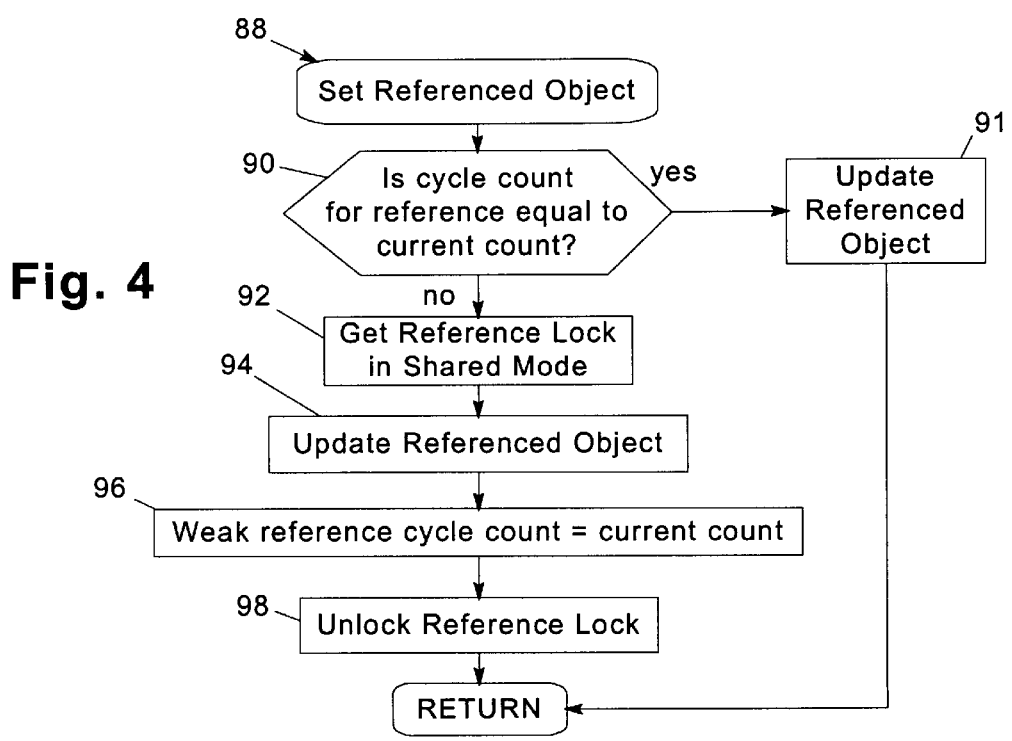
FIG. 4 is a flowchart illustrating the program flow of a set referenced object routine consistent with the invention.
Figure 5:
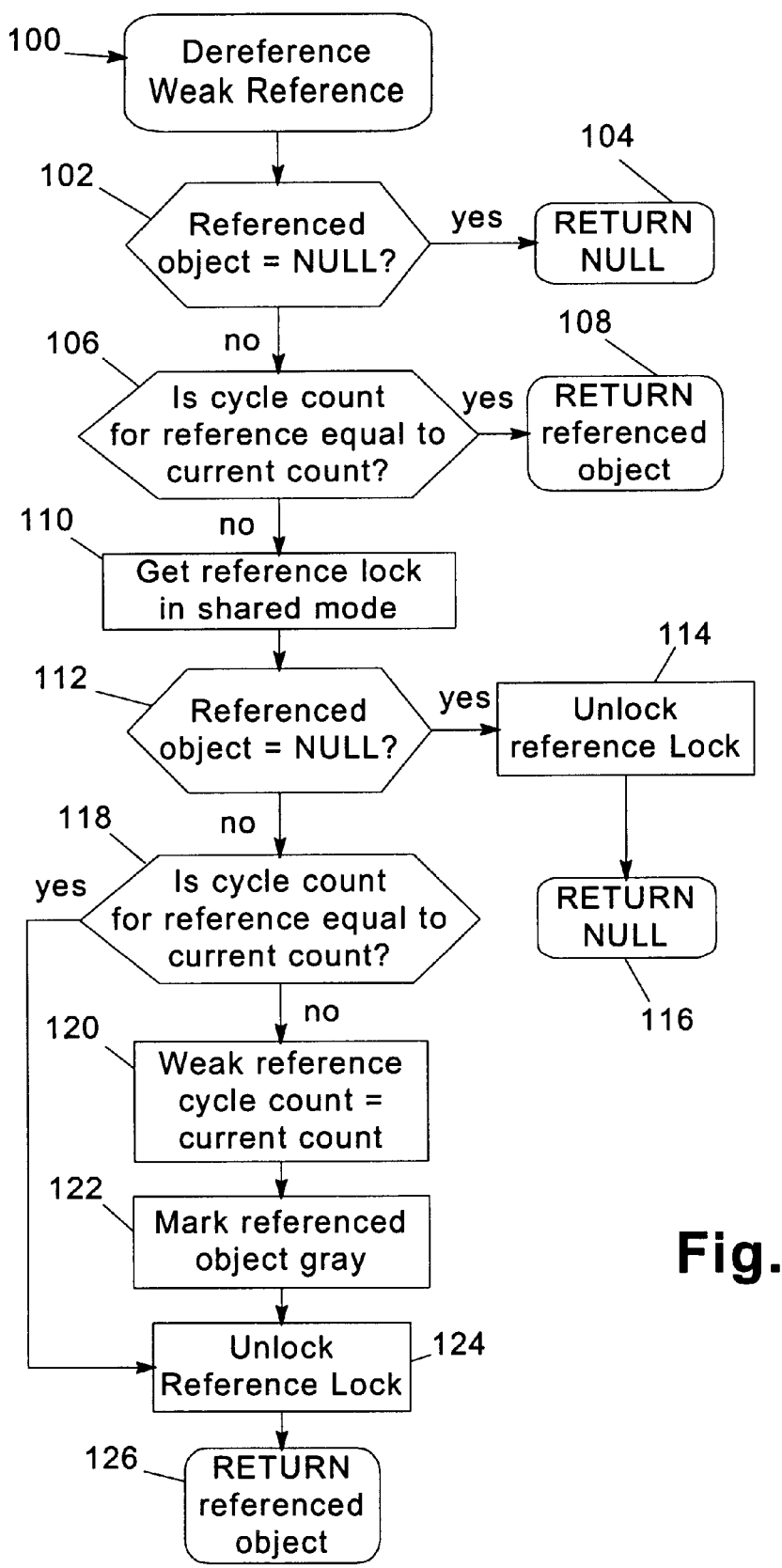
FIG. 5 is a flowchart illustrating the program flow of a dereference weak reference routine consistent with the invention.
Figure 6:
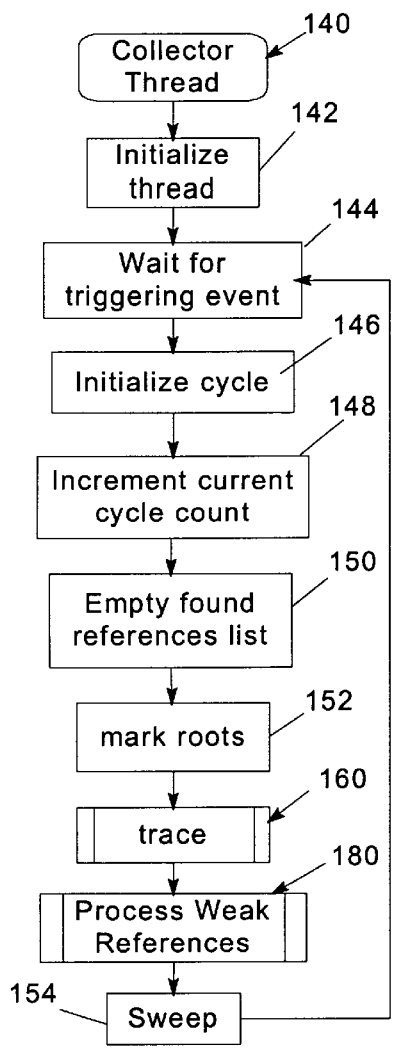
FIG. 6 is a flowchart illustrating the program flow of the collector thread of FIG. 2.
Figure 7:
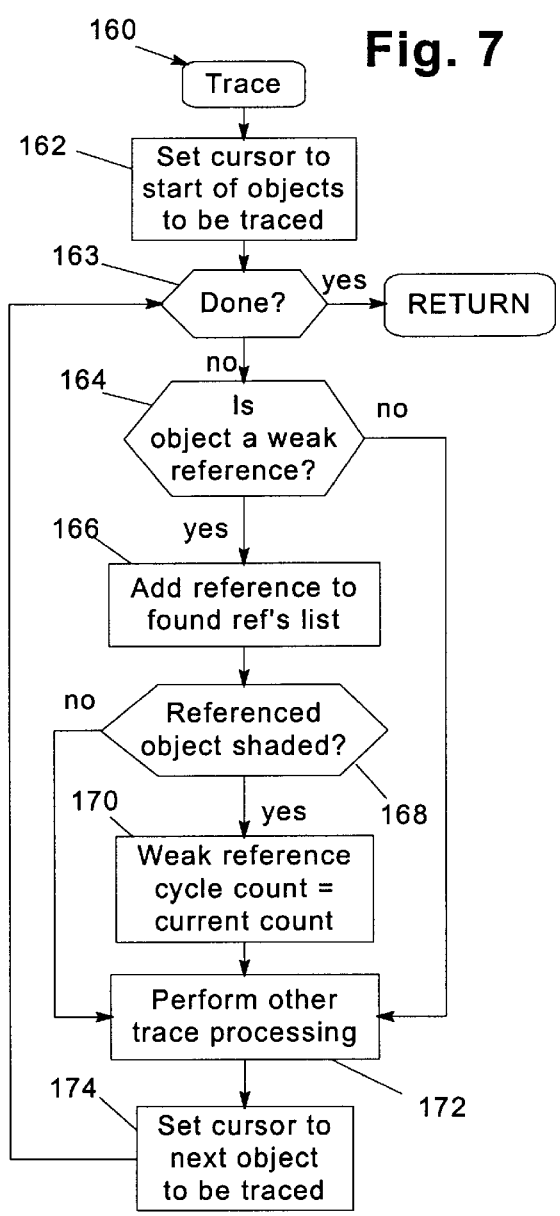
FIG. 7 is a flowchart illustrating the program flow of the trace routine of FIG. 6.
Figure 8:
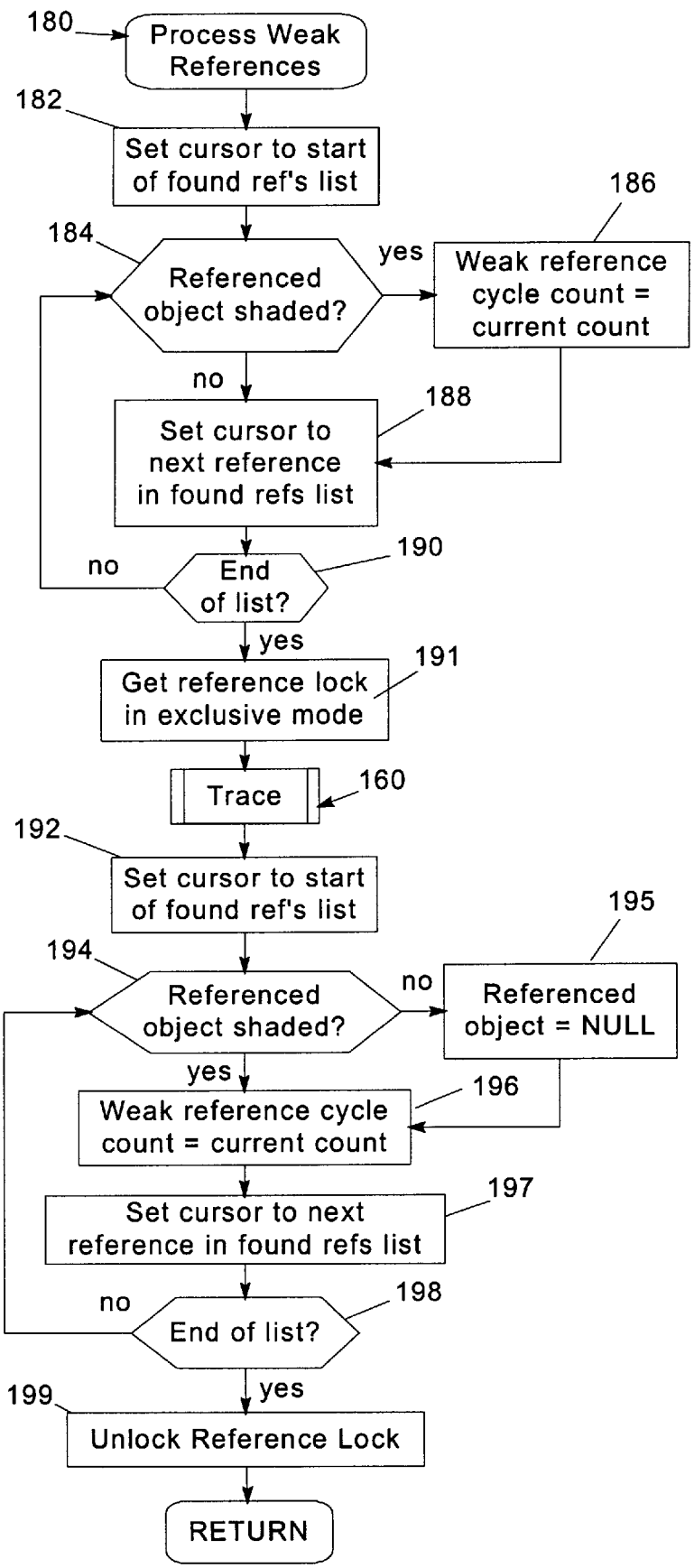
FIG. 8 is a flowchart illustrating the program flow of the process weak references routine of FIG. 6.

Selective management of weak references consistent with the invention typically requires coordinated synchronization between both the routines through which program threads access weak references, and the routines utilized by a mark sweep collector in collecting unused objects and processing the weak references. FIGS. 4 and 5, for example, illustrate several routines through which program threads typically access weak references. FIGS. 6–8 in turn illustrate the coordinated operation of a concurrent mark sweep collector consistent with the invention.

In the implementation described in greater detail herein, a global weak reference locking mechanism is utilized, such that selective access inhibiting for particular weak references is implemented by utilizing a global weak reference locking mechanism to obtain exclusive access for the concurrent mark sweep collector while processing weak references, and then bypassing, or overriding, the global weak reference locking mechanism as appropriate in any routine that attempts to access a weak reference when the cycle count for the weak reference indicates that the referenced object is known to be strongly-reachable in the current collection cycle. However, it should be appreciated that in other implementations the responsibilities for selective access inhibiting may be partitioned to different extents in the collector and the routines that attempt to access the weak references.

Moreover, in the implementation described in greater detail herein, a global shared/exclusive locking mechanism is used. In other implementations, other locking mechanisms may be used, e.g., mutually-exclusive locking mechanisms, individual object locking mechanisms, etc. The implementation of locking mechanisms in general is known in the art, and will not be discussed in greater detail herein.

It is assumed that upon creation, a weak reference will have its weak reference cycle count set to the current collection cycle count and its referenced object set to either NULL or to an initial value. If the referenced object is set to an initial value, the field is set in the same manner as any pointer in an object is set, based upon the update mechanism for the specific collector implementation being used. It is also assumed that a new collector cycle will not start while a create operation or any other access operation on a weak reference is in progress, e.g., by using a cooperate mechanism such as the handshake mechanism of the Doligez-Gonthier algorithm.

One routine through which a program thread may access a weak reference is through a set referenced object routine 88, which is illustrated in greater detail in FIG. 4. Routine 88 is typically called by a program thread whenever it is desired to update the referenced object field for a weak reference. Routine 88 receives as input a pointer to an object to be referenced by the weak reference, and begins at block 90 by determining whether the cycle count for the weak reference is equal to the cycle count for the current collection cycle.

If so, no additional synchronization is required to prevent the collector from clearing the weak reference. Therefore, control passes to block 91 to update the referenced object for the weak reference by storing the pointer passed to routine 88 in field 52 (FIG. 2) for the weak reference, using the update mechanism of the collector, which may involve a write barrier similar to that use by the update mechanism of the Doligez-Gonthier algorithm. Upon completion of block 91, routine 88 is complete.

Returning to block 90, if the weak reference cycle count does not match the cycle count of the current collection cycle, additional synchronization is required since the current referenced object for the weak reference is not yet known to be strongly-reachable in the current collection cycle and the collector thread could clear it. Therefore, control passes to block 92 to attempt to obtain exclusive access to the weak references through obtaining a lock in shared mode from the global weak reference locking mechanism. During this operation, routine 88 waits until the lock is obtained, and thus, may be temporarily stopped, for example, while weak references are being processed by the collector. However, the routine will not be stopped by other threads accessing weak references.

Once the lock is obtained, synchronization is ensured, and thus, the referenced object for the weak reference may be updated in block 94 in the same manner as in block 91. Then, in block 96, the cycle count for the weak reference is set to the cycle count for the current collection cycle to indicate that the referenced object has been made strongly-reachable as a result of this operation. As a result, any further accesses to this weak reference during the current collection cycle will no longer require use of the locking mechanism since the referenced object is ensured of not being collected during the current collection cycle. Next, upon completion of block 96, the reference lock is released in block 98, whereby routine 88 is then complete.

Another routine that may access weak references is dereference weak reference routine 100, which is illustrated in FIG. 5. Routine 100 uses a read barrier to ensure proper synchronization with the collector. Routine 100 is called in response to a request to obtain the pointer stored in a weak reference so that the information within the object referenced by the weak reference may be obtained through use of the pointer. Routine 100 begins in block 102 by determining whether the referenced object field for the weak reference is set to NULL, indicating that the weak reference is not pointing to another object. If so, block 104 is executed to return the NULL value and terminate the routine.

If the referenced object is not NULL, control passes to block 106 to determine whether the cycle count for the weak reference is equal to the cycle count for the current collection cycle. If so, synchronization is assured by virtue of the object referenced by the weak reference being known strongly-reachable in the current collection cycle. Therefore, similar to set reference routine 88, the global weak reference locking mechanism may be bypassed by passing control to block 108 to return the pointer to the referenced object for the weak reference, whereby the routine is complete.

Returning to block 106, if the weak reference cycle count does not match the cycle count of the current collection cycle, additional synchronization is required since the referenced object for the weak reference is not yet known to be strongly-reachable in the current collection cycle. Therefore, control passes to block 110 to attempt to obtain non-exclusive access to the weak references through obtaining a lock in shared mode from the global weak reference locking mechanism. During this operation, routine 100 waits until the lock is obtained, and thus, may be temporarily stopped, for example, while weak references are being processed by the collector. However, the routine will not be stopped by other threads accessing weak references.

Once the lock is obtained, synchronization is ensured, and thus, processing continues by re-checking for activities that may have occurred while the routine was waiting for access through the locking mechanism. First block 112 determines whether the referenced object field for the weak reference is set to NULL, indicating that the weak reference is no longer pointing to another object (e.g., if the weak reference was cleared during collection). If so, blocks 114 and 116 are executed to release the global weak reference locking mechanism, return the NULL value stored in the weak reference and terminate the routine.

Returning to block 112, if the referenced object is not NULL, control passes to block 118 to determine whether the cycle count for the weak reference is now equal to the cycle count for the current collection cycle (indicating that the weak reference has been accessed in the interim). If not, control passes to blocks 120 and 122 to respectively set the cycle count for the weak reference to the cycle count for the current collection cycle and mark the referenced object gray in color table 70, thereby indicating that the referenced object has been made strongly-reachable as a result of this operation. Control then passes to block 124 to release the locking mechanism, and to block 126 to return the pointer to the referenced object for the weak reference, whereby routine 100 is then complete. Returning to block 118, if the cycle count for the weak reference does match the cycle count for the current collection cycle, no marking of the referenced object is required, and control may be passed directly to blocks 124 and 126 prior to terminating the routine.

The program flow of collector thread 34 is illustrated in greater detail by flowchart 140 in FIG. 6. Collector thread 34 may operate in much the same manner as a conventional mark sweep collector, with a number of exceptions that are outlined in greater detail below.

First, in block 142, the collector thread is initialized in a manner known in the art. Next, in block 144, collector thread 34 waits for a triggering event to initiate a new collection cycle for the thread. Rather than running continuously, it should be appreciated that collector thread 34 does not start new collection cycles at arbitrary points. Rather, it may be desirable to wait for certain operations to be completed prior to starting a new collection cycle.

Upon triggering of a new collection cycle, control passes to block 146 to initialize the cycle in a manner that is also known in the art. During initialization, the collector notifies the program threads that a new cycle has begun using a cooperation mechanism such as the handshake mechanism of the Doligez-Gonthier algorithm. Next, in block 148, the current collection cycle count 56 (FIG. 3) is incremented to indicate a new current cycle.

To ensure synchronization, it may be desirable, for example, to ensure that all program threads know that a new collection cycle has started prior to changing the cycle count. It may also be desirable to ensure that when a new weak reference is created, it is created with the current cycle count. Moreover, it may be desirable to use a write barrier or similar mechanism with the collector, as well as with any stores made into a weak reference, for updates to pointer slots on objects so that it is ensured that all references stored into an object after the collection cycle begins will eventually be colored black during the collection cycle, e.g., similar to the combination of a write barrier and handshake mechanism utilized by the aforementioned Doligez-Gonthier algorithm.

Returning to FIG. 6, block 150 is next executed to empty found references list 40 by setting the first reference pointer 42 to NULL. Next, in blocks 152 and 160, mark roots and trace stages of the collection cycle are performed to shade all reachable objects in the object heap. Any number of suitable algorithms (e.g., as discussed above) may be used consistent with the invention, with trace stage 160 modified as described in greater detail below to handle weak references consistent with the invention.

Next, a process weak references routine 180 is executed to process weak references in a manner described in greater detail below. Next, as illustrated by block 154, a sweep stage is performed to collect any unmarked objects in the object heap, in any number of manners known in the art. It should further be appreciated that any of the modifications to this stage as described in the aforementioned incorporated application may also be used.

Upon completion of the sweep stage, control returns to block 144 to wait for a triggering event to initialize a new collection cycle. A collector thread thus operates in a continuous loop in this manner until the thread is killed, e.g., by shut-down of the execution module via another program thread.

The routine that implements trace stage 160 is illustrated in greater detail in FIG. 7. Routine 160 presents a trace routine in the abstract. One skilled in the art will appreciate, however, that any number of known trace algorithms may be used consistent with the invention.

Routine 160 begins in block 162 by setting a cursor to point to the first object in an "objects to be traced" list, the use of which is well known in the art. There are many ways known in the art to keep track of such a list, including, for example, scanning the object heap looking for gray objects as in the Dijkstra and Doligez-Gonthier algorithms, scanning a color bitmap for gray objects, using a mark stack to keep track of gray objects, or a combination thereof. Other known ways may also be used in the alternative.

Next, block 163 determines whether any such objects have been added to the list, process that depends upon the tracing algorithm used. If not, the trace is complete. If, however, additional objects remain to be traced, control passes to block 164 to determine whether the object is a weak reference. If so, control passes to block 166 to add the reference to found references list 40, e.g., by storing a pointer to the weak reference in next weak reference field 54 of the last weak reference in list 40. Next, block 168 determines whether the object referenced by the weak reference is shaded (i.e., has a "black" or "gray" color in the color table). If the object is shaded, block 170 is executed to set the cycle count for the weak reference to the cycle count of the current collection cycle, indicating that the referenced object has been determined to be strongly-reachable in the current collection cycle. Control then passes to block 172 to perform other trace processing (e.g., to shade the children of the object being traced and add them as necessary to the list of objects to be traced), as is well known in the art. Next, block 174 sets the cursor to the next object in the list to be traced, and control returns to block 163 to continue tracing the next object. The process then continues until all objects on the list have been processed, whereby block 163 will terminate the routine.

Returning to block 168, if the referenced object for the weak reference being traced is not shaded, block 170 is bypassed, and control passes to block 172 to perform other trace processing as is known in the art. Similarly, returning to block 164, if the object being traced is not a weak reference, control is passed directly to block 174 to handle tracing of the object in a manner well known in the art.

Process weak references routine 180 is executed between the trace and sweep stages of the collection cycle to clear any weak references to unused objects that are to be collected during the sweep stage. Routine 180 operates in two passes, with the first pass operating to reduce to a minimum the number of program threads that could be stopped by the second pass of the routine, and with the second pass operating to clear any weak references that reference unshaded objects. The use of two passes attempts to balance the granularity of synchronization with the increased processing cost associated therewith. In other implementations the first pass could be combined with the second pass if desired.

As shown in FIG. 8, the first pass of routine 180 operates to update the weak reference cycle counts for any weak references that reference objects that have been determined to be strongly-reachable, so that any accesses thereto while processing the weak references in the second pass may bypass the global weak reference locking mechanism. The first pass begins in block 182 by setting a cursor to the start of found refs list 40 (e.g., the object referenced by pointer 42 of FIG. 2). Block 184 determines whether the referenced object for the currently-processed weak reference is shaded. If so, block 186 is executed to set the cycle count for the weak reference to the current cycle count, indicating that the referenced object has been determined to be strongly-reachable in the current collection cycle. Control then passes to block 188 to set the cursor to the next reference in the found refs list (i.e., by following the reference in the next weak reference field 54 (FIG. 2) of the weak reference currently being processed. Returning to block 184, if the referenced object is not shaded, block 186 is bypassed and control passes directly to block 188.

Upon completion of block 188, block 190 determines whether the end of list 40 has been reached (e.g., when the pointer in field 54 is set to NULL). If not, control passes back to block 184 to process the next weak reference in the list. If so, the first pass of the routine is complete, and control passes to block 191 to begin the second pass thereof.

In the second pass, weak references that reference unshaded objects are cleared, while the weak reference cycle counts of weak references that reference shaded objects are updated to indicate the determination that the referenced objects therefor are strongly-reachable. The second pass begins in block 191 by attempting to obtain the global weak reference lock in exclusive mode. The routine then waits until the lock is obtained, and trace routine 160 is then called to finish up any tracing required for objects that have been added to the objects to be traced list while the routine attempted to obtain exclusive access via the global weak reference locking mechanism.

Next, block 192 sets the cursor to the start of list 40, and block 194 initiates a loop that first determines whether the referenced object for the weak reference currently being processed is shaded. If not, control passes to block 195 to clear the weak reference by setting the referenced object field 52 (FIG. 2) therefor to NULL. Control then passes to block 196 to update the weak reference cycle count to that of the current collection cycle. Returning to block 194, if the referenced object for the weak reference is shaded, block 195 is bypassed and control passes directly to block 196. Upon completion of block 196, block 197 is executed to set the cursor to the next weak reference in list 40. So long as additional weak references remain to be processed, block 198 then passes control back to block 194 to process the other weak references. Once all weak references are processed, however, block 198 passes control to block 199 to release the global weak reference locking mechanism, whereby routine 180 is complete.

The above described implementation provides unique advantages over conventional garbage collection algorithms in handling weak references. Specifically, management of weak references in the manner described herein significantly reduces the performance impact associated with managing weak references since fewer weak references are effectively locked from access by other program threads while the collector is processing the weak references. As such, only those weak references that reference objects for which it is unknown whether such objects are strongly-reachable in the current collection cycle are locked from access during processing thereof. Consequently, fewer program threads are likely to be stopped as a result of weak reference management by a collector.

Various modifications may be made to the above-described embodiments consistent with the invention. For example, a weak reference may be placed on a queue by the collector when its reference is cleared, which would act as a notification to a program thread that the weak reference has been cleared. Also, while processing the weak references, the collector may be configured to clear only a portion of the weak references, e.g., based upon memory or paging considerations. In such a case, the collector would be required to resuming tracing from the referenced objects for weak references that were not cleared.

Moreover, during a dereference operation, a collected object could be reconstituted rather than returning a NULL pointer should it be determined that the referenced object was collected. In addition, in some implementations, weak references may be immutable, so that they are set once when created and never updated thereafter. In such a case, no set referenced object routine would be required.

Various additional modifications may be made to the above-described embodiments without departing from the spirit and scope of the invention. Therefore, the invention lies in the claims hereinafter appended.

What is claimed is:

1. A computer implemented method of managing weak references with a concurrent mark sweep collector, the method comprising, during a current collection cycle of the concurrent mark sweep collector:

(a) analyzing a plurality of objects to determine whether any of the objects are strongly-reachable;

(b) processing weak references to the plurality of objects and clearing any weak references to objects that are not determined to be strongly-reachable; and (c) while processing the weak references, inhibiting access to a predetermined weak reference only if the object referenced by the predetermined weak reference has not yet been determined to be strongly-reachable during the current collection cycle.

2. The method of claim 1, further comprising indicating that the object referenced by the predetermined weak reference is strongly-reachable during the current collection cycle.

3. The method of claim 2, wherein indicating that the object referenced by the predetermined weak reference is strongly-reachable during the current collection cycle includes indicating that the object referenced by the predetermined weak reference is strongly-reachable during the current collection cycle in response to a dereference operation performed on the predetermined weak reference during the current collection cycle.

4. The method of claim 2, wherein indicating that the object referenced by the predetermined weak reference is strongly-reachable during the current collection cycle includes indicating that the object referenced by the predetermined weak reference is strongly-reachable during the current collection cycle in response to creation of the weak reference during the current collection cycle.

5. The method of claim 2, wherein indicating that the object referenced by the predetermined weak reference is strongly-reachable during the current collection cycle includes indicating that the object referenced by the predetermined weak reference is strongly-reachable during the current collection cycle in response to an update to the weak reference during the current collection cycle.

6. The method of claim 2, wherein indicating that the object referenced by the predetermined weak reference is strongly-reachable during the current collection cycle includes indicating that the object referenced by the predetermined weak reference is strongly-reachable during the current collection cycle in response to a trace operation performed on the predetermined weak reference during the current collection cycle.

7. The method of claim 1, wherein each weak reference has associated therewith a referenced object reachable indicator that indicates whether the object referenced by the weak reference has been determined to be strongly-reachable during the current collection cycle, the method further comprising, during a dereference operation performed on the predetermined weak reference, bypassing any inhibition of access to the predetermined weak reference in response to the referenced object reachable indicator indicating that the object referenced by the predetermined weak reference has been determined to be strongly-reachable during the current collection cycle.

8. The method of claim 7, further comprising performing a plurality of collection cycles, including associating a collection cycle indicator with each of the plurality of collection cycles, wherein the referenced object reachable indicator for each weak reference includes a weak reference cycle indicator that indicates the collection cycle indicator for the then current collection cycle when the object referenced by the weak reference was last determined to be strongly-reachable, and wherein bypassing any inhibition of access to the predetermined weak reference is performed in response to the weak reference cycle indicator for the predetermined weak reference matching the collection cycle indicator for the current collection cycle.

9. The method of claim 8, wherein the collection cycle indicator is a one-bit value that distinguishes between a current and a previous collection cycle.

10. The method of claim 7, wherein processing the weak reference s further includes, prior to inhibiting access to any weak reference, analyzing each weak reference to determine whether the object referenced thereby has been found to be strongly-reachable during the current collection cycle, and if so, setting the referenced object reachable indicator therefor to indicate that the object referenced by the weak reference has been determined to be strongly-reachable during the current collection cycle.

11. The method of claim 1, wherein the weak references share a locking mechanism configured to grant exclusive access to the weak references, and wherein inhibiting access to the predetermined weak reference includes obtaining from the locking mechanism exclusive access to the weak references for the concurrent mark sweep collector while the weak references are being processed.

12. The method of claim 11, further comprising performing a dereference operation on the predetermined weak reference while weak references are being processed by the concurrent mark sweep collector, including:

(a) determining whether the object referenced by the predetermined weak reference has been determined to be strongly-reachable during the current collection cycle;

(b) if the object referenced by the predetermined weak reference has been determined to be strongly-reachable during the current collection cycle, retrieving a reference to the object referenced by the predetermined weak reference irrespective of whether exclusive access to the weak references has been granted by the locking mechanism; and (c) if the object referenced by the predetermined weak reference has not been determined to be strongly-reachable during the current collection cycle, waiting until any exclusive access to the weak references has been released by the locking mechanism before retrieving the reference to the object referenced by the predetermined weak reference.

13. The method of claim 1, wherein inhibiting access to the predetermined weak reference permits both read and write access to the predetermined weak reference if the object referenced by the predetermined weak reference has been determined to be strongly-reachable during the current collection cycle.

14. The method of claim 1, wherein analyzing the plurality of objects includes building a list of weak references, and wherein processing the weak references to the plurality of objects includes analyzing each weak reference in the list of weak references.

15. The method of claim 1, wherein analyzing the plurality of objects includes performing a trace operation to determine the reachability of the plurality of objects, wherein the method further comprises performing a sweep operation to collect any objects not determined to be strongly-reachable during the trace operation, and wherein processing the weak references is performed between the trace and sweep operations.

16. A computer implemented method of managing weak references with a concurrent mark sweep collector, the method comprising:

(a) performing a plurality of collection cycles, including associating a collection cycle indicator with each of the plurality of collection cycles;

(b) associating a weak reference cycle indicator with each of a plurality of weak references, each weak reference cycle indicator representative of the collection cycle indicator for the then current collection cycle when the object referenced by the weak reference was last determined to be strongly-reachable;

(c) during a current collection cycle, processing the plurality of weak references, including:
  (1) clearing at least one of the plurality of weak references that references an object not determined to be strongly-reachable during the current collection cycle; and
  (2) inhibiting access to the plurality of weak references during processing of the plurality of weak references; and
(d) during a dereference operation performed on a predetermined weak reference from the plurality of weak references during the current collection cycle, bypassing any inhibition of access to the predetermined weak reference established during processing of the plurality of weak references if the weak reference cycle indicator associated therewith matches the collection cycle indicator for the current collection cycle.

17. The method of claim 16, further comprising, during the dereference operation, waiting until access to the predetermined weak reference is not inhibited if the weak reference cycle indicator associated therewith does not match the collection cycle indicator for the current collection cycle.

18. The method of claim 16, further comprising setting the weak reference cycle indicator for the predetermined weak reference to the collection cycle indicator for the current collection cycle during the dereference operation if the weak reference cycle indicator associated therewith does not match the collection cycle indicator for the current collection cycle.

19. The method of claim 16, further comprising setting the weak reference cycle indicator for the predetermined weak reference to the collection cycle indicator for the current collection cycle during creation of the weak reference during the current collection cycle.

20. The method of claim 16, further comprising setting the weak reference cycle indicator for the predetermined weak reference to the collection cycle indicator for the current collection cycle during updating of the weak reference during the current collection cycle if the weak reference cycle indicator associated therewith does not match the collection cycle indicator for the current collection cycle.

21. The method of claim 16, further comprising setting the weak reference cycle indicator for the predetermined weak reference to the collection cycle indicator for the current collection cycle during a trace operation performed on the predetermined weak reference during the current collection cycle if the object referenced by the predetermined weak reference is determined to be strongly-reachable during the current collection cycle.

22. The method of claim 16, wherein the collection cycle indicator is a one-bit value that distinguishes between a current and a previous collection cycle.

23. The method of claim 16, wherein processing each of the plurality of weak references further includes, prior to inhibiting access to the plurality of weak references, analyzing each weak reference to determine whether the object referenced thereby has been found to be strongly-reachable during the current collection cycle, and if so, setting the weak reference cycle indicator therefor to the collection cycle indicator for the current collection cycle.

24. The method of claim 16, wherein the plurality of weak references share a locking mechanism configured to grant exclusive access thereto, and wherein inhibiting access to the plurality of weak references includes obtaining from the locking mechanism exclusive access to the plurality of weak references.

25. A computer system, comprising:
(a) a processor; and
(b) a concurrent mark sweep collector configured to be executed by the processor to manage weak references, the concurrent mark sweep collector configured to, during a current collection cycle, analyze a plurality of objects to determine whether any of the objects are strongly-reachable; process weak references to the plurality of objects and clear at least one weak reference to an object that is not determined to be strongly-reachable; and, while processing the weak references, inhibit access to a predetermined weak reference only if the object referenced by the predetermined weak reference has not yet been determined to be strongly-reachable during the current collection cycle.

26. A computer system, comprising:
(a) a processor;
(b) a concurrent mark sweep collector configured to be executed by the processor to manage weak references, the concurrent mark sweep collector configured to perform a plurality of collection cycles, with collection cycle having associated therewith a collection cycle indicator; to associate a weak reference cycle indicator with each of a plurality of weak references, with each weak reference cycle indicator representative of the collection cycle indicator for the then current collection cycle when the object referenced by the weak reference was last determined to be strongly-reachable; and, during a current collection cycle, process the plurality of weak references by clearing at least one of the plurality of weak references that references an object not determined to be strongly-reachable during the current collection cycle; and inhibiting access to the plurality of weak references during processing of the plurality of weak references; and
(c) a program thread configured to be executed by the processor concurrently with the concurrent mark sweep collector, the program thread configured to perform a dereference operation on a predetermined weak reference from the plurality of weak references during the current collection cycle, wherein the dereference operation bypasses any inhibition of access to the predetermined weak reference established while the concurrent mark sweep collector processes the plurality of weak references if the weak reference cycle indicator associated therewith matches the collection cycle indicator for the current collection cycle.

27. A computer program product, comprising:
(a) a program configured to perform a method of managing weak references with a concurrent mark sweep collector, the method comprising, during a current collection cycle of the concurrent mark sweep collector:
  (1) analyzing a plurality of objects to determine whether any of the objects are strongly-reachable;
  (2) processing weak references to the plurality of objects and clearing at least one weak reference to an object that is not determined to be strongly-reachable; and
  (3) while processing the weak references, inhibiting access to a predetermined weak reference only if the object referenced by the predetermined weak reference has not yet been determined to be strongly-reachable during the current collection cycle; and
(b) a signal bearing media bearing the program.

28. The program product of claim 27, wherein the signal bearing media is transmission type media.

29. The program product of claim 27, wherein the signal bearing media is recordable media.

30. A computer program product, comprising:
(a) a program configured to perform a method of managing weak references with a concurrent mark sweep collector, the method comprising:
  (1) performing a plurality of collection cycles, including associating a collection cycle indicator with each of the plurality of collection cycles;
  (2) associating a weak reference cycle indicator with each of a plurality of weak references, each weak reference cycle indicator representative of the collection cycle indicator for the then current collection cycle when the object referenced by the weak reference was last determined to be strongly-reachable;
  (3) during a current collection cycle, processing the plurality of weak references, including clearing at least one of the plurality of weak references that references an object not determined to be strongly-reachable during the current collection cycle, and inhibiting access to the plurality of weak references during processing of the plurality of weak references; and
  (4) during a dereference operation performed on a predetermined weak reference from the plurality of weak references during the current collection cycle, bypassing any inhibition of access to the predetermined weak reference established during processing of the plurality of weak references if the weak reference cycle indicator associated therewith matches the collection cycle indicator for the current collection cycle; and
(b) a signal bearing media bearing the program.

31. The program product of claim 30, wherein the signal bearing media is transmission type media.

32. The program product of claim 30, wherein the signal bearing media is recordable media.

* * * * *